United States Patent [19]
Weinberg et al.

[11] Patent Number: 5,952,574
[45] Date of Patent: Sep. 14, 1999

[54] TRENCHES TO REDUCE CHARGING EFFECTS AND TO CONTROL OUT-OF-PLANE SENSITIVITIES IN TUNING FORK GYROSCOPES AND OTHER SENSORS

[75] Inventors: Marc S. Weinberg, Needham, Mass.; Steven T. Cho, Santa Clara, Calif.; Ralph E. Hopkins, III, Brookline, Mass.; Lance C. Niles, Salem, Mass.; Anthony S. Kourepenis, Acton, Mass.; Eric M. Hildebrant, Watertown, Mass.; Paul A. Ward, Roslindale, Mass.

[73] Assignee: The Charles Stark Draper Laboratory, Inc., Cambridge, Mass.

[21] Appl. No.: 08/841,224

[22] Filed: Apr. 29, 1997

[51] Int. Cl.⁶ .................................................. G01C 19/00
[52] U.S. Cl. ................................... 73/504.16; 73/504.12; 438/50
[58] Field of Search ............................ 73/504.16, 504.15, 73/504.12, 504.02, 504.03, 504.04, 514.29, 514.32; 310/370, 311, 309; 216/2; 438/50

[56] References Cited

U.S. PATENT DOCUMENTS

| | | | |
|---|---|---|---|
| Re. 32,931 | 5/1989 | Staudte | 73/505 |
| Re. 33,479 | 12/1990 | Juptner et al. | 73/505 |
| 3,053,095 | 9/1962 | Koril et al. | 73/504 |
| 3,251,231 | 5/1966 | Hunt et al. | 73/505 |
| 3,370,458 | 2/1968 | Dillon | 73/141 |
| 3,696,429 | 10/1972 | Tressa | 343/180 |
| 3,913,035 | 10/1975 | Havens | 331/107 R |
| 4,044,305 | 8/1977 | Oberbeck | 324/154 R |
| 4,122,448 | 10/1978 | Martin | 343/7.7 |
| 4,144,764 | 3/1979 | Hartzell, Jr. | 73/497 |
| 4,155,257 | 5/1979 | Wittke | 73/497 |
| 4,234,666 | 11/1980 | Gursky | 428/573 |
| 4,321,500 | 3/1982 | Paros et al. | 310/321 |
| 4,336,718 | 6/1982 | Washburn | 73/517 B |
| 4,342,227 | 8/1982 | Petersen et al. | 73/510 |
| 4,381,672 | 5/1983 | O'Connor et al. | 73/505 |
| 4,406,992 | 9/1983 | Kurtz et al. | 338/2 |
| 4,411,741 | 10/1983 | Janata | 204/1 T |

(List continued on next page.)

FOREIGN PATENT DOCUMENTS

| | | | |
|---|---|---|---|
| 55-121728 | 9/1980 | Japan | H03H 9/19 |
| 58-136125 | 8/1983 | Japan | H04H 9/17 |
| 59-037722 | 3/1984 | Japan | H03H 9/17 |
| 59-158566 | 9/1984 | Japan | H01L 29/84 |
| 61-144576 | 7/1986 | Japan | G01P 15/09 |
| 62-071256 | 8/1987 | Japan | H01L 27/06 |
| 62-221164 | 9/1987 | Japan | H01L 29/84 |
| 63-169078 | 7/1988 | Japan | H01L 29/84 |
| 2183040 | 5/1987 | United Kingdom | G01F 15/02 |
| 9201941 | 2/1992 | WIPO | G01P 9/04 |
| 9305401 | 3/1993 | WIPO | G01P 9/04 |

OTHER PUBLICATIONS

Barth, P.W. et al., "A Monolithic Silicon Accelerometer With Integral Air Damping and Overrange Protection", 1988 IEEE, pp. 35–38.

Boxenhorn, B., et al., "An Electrostatically Rebalanced Micromechanical Acceleratometer," *AIAA Guidance, Navigation and Control Conference,* Boston, Aug. 14–16, 1989, pp. 118–122.

*Primary Examiner*—Hezron Williams
*Assistant Examiner*—Richard A. Moller
*Attorney, Agent, or Firm*—Weingarten, Schurgin, Gagnebin & Hayes LLP

[57] ABSTRACT

Trenches which reduce or eliminate force and sensitivity associated with proof mass motion normal to the substrate as a result of voltage transients is disclosed. The trenches provide increased separation between interleaved comb electrodes and the substrate, and thereby also reduce the comb lift to drive ratio. The trenches are typically formed directly below the interleaved comb electrodes, but may also be formed below other suspended portions. Trench depth is from 6–10 microns and provides a comb electrode to substrate separation of approximately 8.5–12.5 microns.

19 Claims, 2 Drawing Sheets

U.S. PATENT DOCUMENTS

| | | | |
|---|---|---|---|
| 4,414,852 | 11/1983 | McNeill | 73/765 |
| 4,447,753 | 5/1984 | Ochiai | 310/312 |
| 4,468,584 | 8/1984 | Nakamura et al. | 310/370 |
| 4,478,076 | 10/1984 | Bohrer | 73/204 |
| 4,478,077 | 10/1984 | Bohrer et al. | 73/204 |
| 4,483,194 | 11/1984 | Rudolf | 73/517 R |
| 4,484,382 | 11/1984 | Kawashima | 29/25.35 |
| 4,490,772 | 12/1984 | Blickstein | 361/281 |
| 4,495,499 | 1/1985 | Richardson | 343/5 DD |
| 4,499,778 | 2/1985 | Westhaver et al. | 74/5 F |
| 4,502,042 | 2/1985 | Wuhrl et al. | 340/568 |
| 4,522,072 | 6/1985 | Sulouff et al. | 73/765 |
| 4,524,619 | 6/1985 | Staudte | 73/505 |
| 4,538,461 | 9/1985 | Juptner et al. | 73/505 |
| 4,585,083 | 4/1986 | Nishiguchi | 177/229 |
| 4,590,801 | 5/1986 | Merhav | 73/510 |
| 4,592,242 | 6/1986 | Kempas | 74/5 F |
| 4,596,158 | 6/1986 | Strugach | 74/5 F |
| 4,598,585 | 7/1986 | Boxenhorn | 73/505 |
| 4,600,934 | 7/1986 | Aine et al. | 357/26 |
| 4,619,001 | 10/1986 | Kane | 455/192 |
| 4,621,925 | 11/1986 | Masuda et al. | 356/350 |
| 4,628,283 | 12/1986 | Reynolds | 331/68 |
| 4,629,957 | 12/1986 | Walters et al. | 318/662 |
| 4,639,690 | 1/1987 | Lewis | 331/96 |
| 4,644,793 | 2/1987 | Church | 73/505 |
| 4,651,564 | 3/1987 | Johnson et al. | 73/204 |
| 4,653,326 | 3/1987 | Danel et al. | 73/517 R |
| 4,654,663 | 3/1987 | Alsenz et al. | 340/870.3 |
| 4,665,605 | 5/1987 | Kempas | 29/434 |
| 4,670,092 | 6/1987 | Motamedi | 156/643 |
| 4,671,112 | 6/1987 | Kimura et al. | 73/505 |
| 4,674,180 | 6/1987 | Zavracky et al. | 29/622 |
| 4,674,319 | 6/1987 | Muller et al. | 73/23 |
| 4,679,434 | 7/1987 | Stewart | 73/517 B |
| 4,680,606 | 7/1987 | Knutti et al. | 357/26 |
| 4,699,006 | 10/1987 | Boxenhorn | 73/517 AV |
| 4,705,659 | 11/1987 | Bernstein et al. | 264/29.6 |
| 4,706,374 | 11/1987 | Murkami | 437/225 |
| 4,712,439 | 12/1987 | North | 74/84 R |
| 4,727,752 | 3/1988 | Peters | 73/517 AV |
| 4,735,506 | 4/1988 | Pavlath | 356/350 |
| 4,736,629 | 4/1988 | Cole | 73/517 R |
| 4,743,789 | 5/1988 | Puskas | 310/316 |
| 4,744,248 | 5/1988 | Stewart | 73/505 |
| 4,744,249 | 5/1988 | Stewart | 73/505 |
| 4,747,312 | 5/1988 | Herzl | 73/861.38 |
| 4,750,364 | 6/1988 | Kawamura et al. | 73/510 |
| 4,761,743 | 8/1988 | Wittke | 364/484 |
| 4,764,244 | 8/1988 | Chitty et al. | 156/630 |
| 4,776,924 | 10/1988 | Delapierre | 156/647 |
| 4,783,237 | 11/1988 | Aine et al. | 437/15 |
| 4,789,803 | 12/1988 | Jacobsen et al. | 310/309 |
| 4,792,676 | 12/1988 | Hojo et al. | 250/231 GY |
| 4,805,456 | 2/1989 | Howe et al. | 73/517 AV |
| 4,808,948 | 2/1989 | Patel et al. | 331/4 |
| 4,815,472 | 3/1989 | Wise et al. | 128/675 |
| 4,834,538 | 5/1989 | Heeks et al. | 356/350 |
| 4,851,080 | 7/1989 | Howe et al. | 156/647 |
| 4,855,544 | 8/1989 | Glenn | 200/61.45 R |
| 4,869,107 | 9/1989 | Murakami | 73/517 R |
| 4,881,410 | 11/1989 | Wise et al. | 73/724 |
| 4,882,933 | 11/1989 | Petersen et al. | 73/517 R |
| 4,884,446 | 12/1989 | Ljung | 73/505 |
| 4,890,812 | 1/1990 | Chechile et al. | 248/674 |
| 4,893,509 | 1/1990 | MacIver et al. | 73/517 AV |
| 4,898,032 | 2/1990 | Voles | 73/505 |
| 4,899,587 | 2/1990 | Staudte | 73/505 |
| 4,900,971 | 2/1990 | Kawashima | 310/361 |
| 4,901,586 | 2/1990 | Blake et al. | 73/862.59 |
| 4,916,520 | 4/1990 | Kurashima | 357/71 |
| 4,922,756 | 5/1990 | Henrion | 73/517 R |
| 4,929,860 | 5/1990 | Hulsing, II et al. | 310/366 |
| 4,981,359 | 1/1991 | Tazartes et al. | 356/350 |
| 5,001,383 | 3/1991 | Kawashima | 310/367 |
| 5,013,396 | 5/1991 | Wise et al. | 156/628 |
| 5,016,072 | 5/1991 | Greiff | 357/26 |
| 5,025,346 | 6/1991 | Tang et al. | 361/283 |
| 5,038,613 | 8/1991 | Takenaka et al. | 73/510 |
| 5,055,838 | 10/1991 | Wise et al. | 340/870 |
| 5,060,039 | 10/1991 | Weinberg et al. | 357/26 |
| 5,090,809 | 2/1992 | Ferrar | 356/350 |
| 5,094,537 | 3/1992 | Karpinski, Jr. | 356/350 |
| 5,138,883 | 8/1992 | Paquet et al. | 73/504 |
| 5,195,371 | 3/1993 | Grieff | 73/505 |
| 5,203,208 | 4/1993 | Bernstein | 73/505 |
| 5,205,171 | 4/1993 | O'Brien et al. | 73/517 B |
| 5,216,490 | 6/1993 | Greiff et al. | 73/517 R |
| 5,226,321 | 7/1993 | Varnham et al. | 73/505 |
| 5,233,874 | 8/1993 | Putty et al. | 73/517 AV |
| 5,241,861 | 9/1993 | Hulsing, II | 73/505 |
| 5,392,650 | 2/1995 | O'Brien et al. | 73/514.18 |
| 5,576,250 | 11/1996 | Diem et al. | 437/228 |

OTHER PUBLICATIONS

Boxenhorn, B., et al., "Micromechanical Inertial Guidance System and its Application", *Fourteenth Biennial Guidance Test Symposium*, vol. 1, Oct. 3–5, 1989, pp. 113–131.

Boxenhorn, B., et al., "Monolithic Silicon Accelerometer", *Transducer '89*, Jun. 25–30, 1989, pp. 273–277.

Boxenhorn, B., et al., "A Vibratory Micromechanical Gyroscope", *AIAA Guidance, Navigation and Control Conference*, Minneapolis, Aug. 15–17, 1988, pp. 1033–1040.

Howe, R., et al., "Silicon Micromechanics: Sensors and Actuators on a Chip", *IEEE Spectrum*, Jul. 1990, pp. 29–35.

Moskalik, L., "Tensometric Accelerometers with Overload Protection", *Meas. Tech.* (*USA*), vol. 22, No. 12, Dec. 1979 (publ. May 1980), pp. 1469–1471.

Nakamura, M., et al., "Novel Electrochemical Micro–Machining and Its Application for Semiconductor Acceleration Sensor IC", *Digest of Technical Papers* (1987), Insitute of Electrical Engineers of Japan, pp. 112–115.

Petersen, K.E., "Micromechanical Accelerometer Integrated with MOS Detection Circuitry", *IEEE*, vol. ED–29 No. 1 (Jan. 1982), pp. 23–27.

Petersen, Kurt E., et al., "Silicon as a Mechanical Material", *Proceedings of the IEEE*, vol. 70, No. 5, May 1982 pp. 420–457.

"Quartz Rate Sensor Replaces Gyros", *Defense Electronics*, Nov. 1984, p. 177.

Rosen, Jerome, "Machining In the Micro Domain", *Mechanical Engineering*, Mar. 1989, pp. 40–46.

Teknekron Sensor Development Corporation, article entitled "Micro–Vibratory Rate Sensor", 1080 Marsh Road, Menlo Park, CA 94025, 2 pages, undated.

Bryzek, Janusz et al., "Micromachines on the March", IEEE Spectrum, May 1994, pp. 20–31.

IEEE Robotics & Automation Soc, in coop. w/ASME Dynamic Systems & Control Div., "Micro Electro Mechanical Systems, An Investigation of Micro Structures, Sensors, Actuators, Machines and Systems", IEEE Cat. #93CH3265–6, Library of Congress #92–56273, Ft. Lauderdale, Fl. 2/7–10/93.

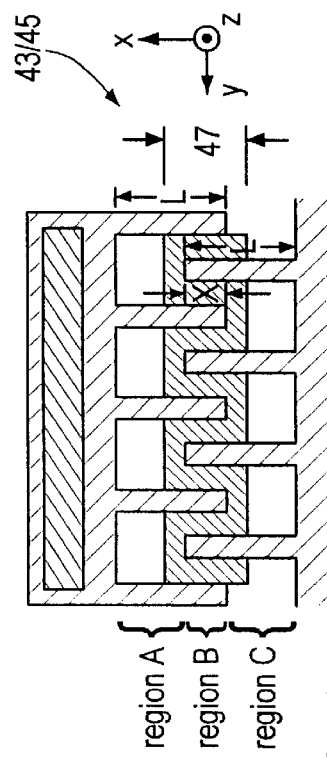
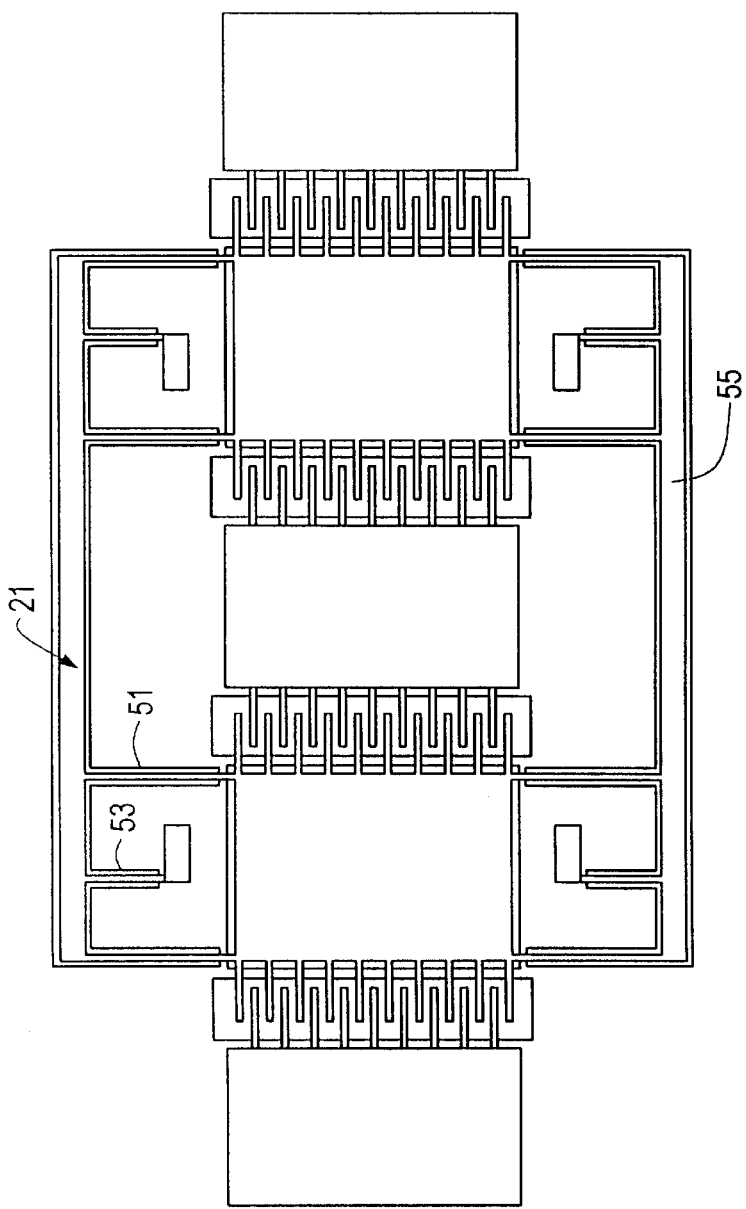

5,952,574

TRENCHES TO REDUCE CHARGING EFFECTS AND TO CONTROL OUT-OF-PLANE SENSITIVITIES IN TUNING FORK GYROSCOPES AND OTHER SENSORS

FIELD OF THE INVENTION

The present invention is related to micromechanical tuning fork gyroscopes, and more particularly to interleaved comb electrodes in micromechanical tuning fork gyroscopes.

BACKGROUND OF THE INVENTION

The basic theories of operation and construction of tuning fork gyroscopes are now fairly well known. Such gyroscopes include a substrate, silicon proof masses with comb electrodes, position sensitive pick-offs, sense electrodes, and inner and outer drives with comb electrodes. The proof masses are suspended above the substrate by a support flexure which permits movement of the proof masses relative to the sense electrode, the drive electrodes and the substrate.

The substrate, which is commonly constructed from glass, has a high electrical resistivity which is partially responsible for voltage transients which can adversely effect gyroscope performance. For example, coupling between comb electrodes is sensitive to such voltage transients. Additionally, the transients impart pick-off sensitivity and undesirable vertical (Z-axis) forces normal to the proof masses. This vertical force and pickoff sensitivity can (a) degrade tuning fork gyroscope performance and (b) prevent the tuning fork gyroscope motor self-oscillator loop from starting.

SUMMARY OF THE INVENTION

In accordance with the present invention, undesirable substrate voltage transient effects are alleviated by increasing the distance between the interleaved comb electrodes and the substrate surface. In a tuning fork gyroscope having drives with interleaved comb electrodes associated therewith, the distance is increased by forming trenches in the substrate below the interleaved comb electrodes. The trenches reduce the comb lift to drive ratio.

Trenches improve drive performance in two areas. First, when a glass substrate is used in a dissolved wafer process, charges accumulate on the surface of the glass as already described. Associated voltages then interact with the proof masses above the exposed glass to adversely effect starting and stability across temperature. When DC excitation of the sense electrodes is used, the charge induced by the voltage transients effectively alters the magnitude of voltage sensed by the motor sense electrodes. The trenches reduce the effects of the transient induced charge by effectively increasing the gap between the comb electrodes and the substrate surface. Second, the interleaved comb electrodes are intended to exert force parallel to the substrate surface. However, a dielectric or conducting substrate result in undesirable electrostatic Z-axis forces which are perpendicular to the substrate surface, and bias stability can thereby be adversely effected. When charging effects are reduced by using a conducting substrate such as silicon, electrostatic lift force from the silicon can be larger than the drive force; a situation where self drive oscillator performance becomes impractical. The trenches reduce the Z-axis lift forces by effectively increasing the gap between the interleaved comb electrodes and the surface of the substrate.

Trenches also offer improved drive performance at a relatively modest cost. It has been found through experimentation that the undesirable effects of substrate voltage transients can be reduced by 50 to 65% in a gyroscope with a comb electrode to substrate surface gap of 2.5 microns by forming trenches with a depth of approximately 6 microns, i.e., increasing the gap in the trench area to 8.5 microns. Advantageously, this improved performance can be achieved without additional electronics using known wafer dissolving processes which are particularly cost efficient.

BRIEF DESCRIPTION OF THE DRAWING

These and other features and advantages of the present invention will be more fully understood from the following detailed description of the invention in which:

FIG. 3 is a plan view of a subsection of the interleaved comb electrodes of FIGS. 1 & 2; and FIG. 4 is a plan view of an alternative embodiment of the tuning fork gyroscope of FIG. 1.

DETAILED DESCRIPTION OF THE DRAWING

Figure 1:
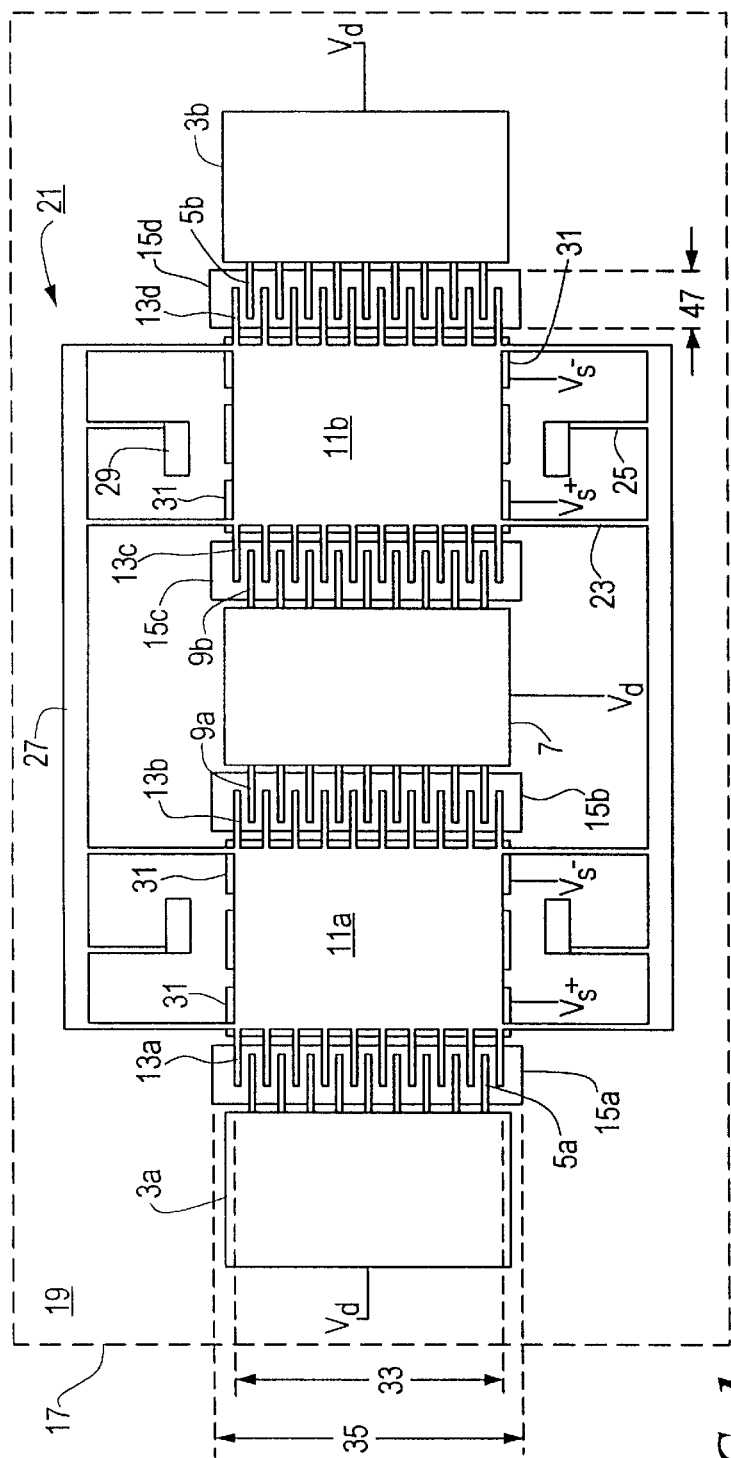
FIG. 1 is a plan view of a tuning fork gyroscope in accordance with the present invention.

FIG. 1 illustrates a tuning fork gyroscope in accordance with the present invention. The tuning fork gyroscope includes outer drives 3a, 3b with comb electrodes 5a, 5b, an inner drive 7 with comb electrodes 9a, 9b, proof masses 11a, 11b with comb electrodes 13a, 13b, 13c, 13d, trenches 15a, 15b, 15c, 15d, a substrate 17 with an upper surface 19, and a support flexure 21 with drive beams 23, torsion beams 25, base beams 27 and anchors 29. The proof masses are suspended above the substrate, and are connected thereto by the support flexure. The anchors connect the torsion beams to the substrate. The torsion beams support the base beams, which in turn support the drive beams. The proof masses are connected to the base beams by the drive beams.

The tuning fork gyroscope functions electromechanically. In operation, the inner and outer drives 7, 3a, 3b impart a vibratory motion to the proof masses 11a, 11b through the comb electrodes. The comb electrodes 5a, 5b of the outer drives extend outward toward the respective adjacent proof masses 11a, 11b, and are disposed above the surface of the substrate. The comb electrodes of the adjacent proof masses 11a, 11b extend outwardly towards the respective outer drives 3a, 3b such that respective outer drive comb electrodes 5a, 5b and proof mass comb electrodes 13a, 13d are interleaved. Comb electrodes 9a, 9b, 13b, 13c between adjacent proof masses and the inner drive are similarly interleaved. As such, time varying drive signals $V_d$ can be provided to the inner and outer drives to induce electrostatic coupling of the drive and proof mass comb electrodes and thereby impart vibratory motion to the proof masses.

Measurement with the tuning fork gyroscope has been described with detail in copending U.S. patent application Ser. No. 08/219,023, entitled ELECTRONICS FOR CORIOLIS FORCE AND OTHER SENSORS, filed in the name of Paul Ward, which is incorporated herein by reference. Briefly, a DC voltage $+_s$, $-V_s$, is applied to sense electrodes 31 to establish a potential difference so that a change in capacitance between the sense electrodes and the adjacent proof masses results in a change in charge on the proof masses. At resonance, proof mass displacement lags drive force by ninety-degrees. In response to an inertial input, and specifically to a rotational rate about an input axis coplanar to the plane of vibration, the proof masses deflect out of the plane of vibration. Such out-of-plane deflection of the proof masses occurs at a frequency corresponding to the resonant frequency of the proof masses and with an amplitude corresponding to the input rotational rate. Thus, detection of out-of-plane deflection of the proof masses provides a measure of the rotational rate.

Voltages applied to the comb electrodes 12a, 12b, 14a, 14b and to the sense electrodes 36 induce both slow transient and AC voltages in the glass substrate, which is a dielectric with loss factor and high, but finite, electrical resistivity. These voltages tend to degrade tuning fork gyroscope bias and scale factor versus time and temperature by injecting current into the proof masses and by applying forces to the proof masses. The trenches reduce the induced voltages and their effects on the proof mass, and hence on gyroscope performance.

The combs are desired to drive or sense motion parallel to the substrate. With conducting or resistive substrates below the combs, the combs affect vertical motion. With conducting substrates, charge transients are not an issue but starting and degraded performance are significant issues. With nonconducting substrates, charge transients, starting and degraded performance are all significant issues. High lift to drive ratio can degrade performance and even prevent the tuning fork gyroscope from starting. Lift to drive ratio is higher in conducting substrates than in dielectric materials. The trenches reduce the comb's lift to drive ratio, a technique which may be applied to both gyroscopes built on nonconducting and conducting (e.g., silicon) to allow larger drive amplitudes.

Figure 2:
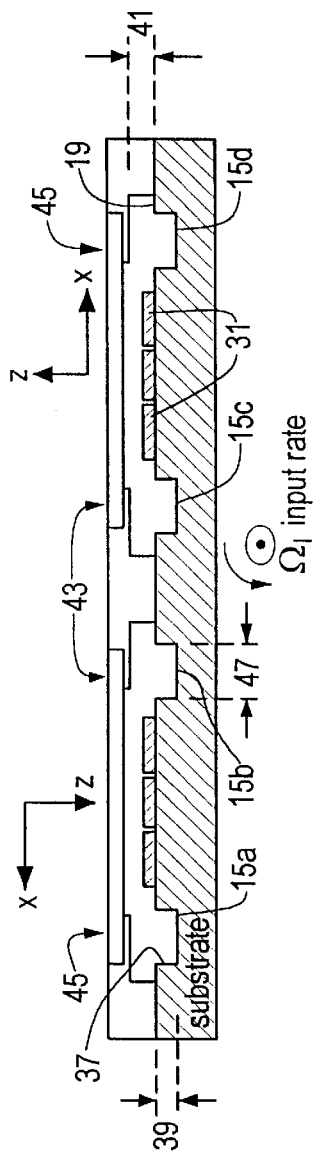
FIG. 2 is a cross sectional view of the gyroscope of FIG. 1 taken along line 1—1.

Turning now to both FIG. 1 and FIG. 2, trenches provide an increased distance between the silicon parts and the substrate, and thereby reduce or eliminate the normal force and sensitivity. A gap 41 is defined between inner and outer interleaved comb electrodes 43, 45 and the surface 19 of the substrate. The undesirable effects of substrate voltage transients on electrostatic coupling of the comb electrodes is at least in part a function of the magnitude of this gap 41. Thus, in order to reduce the effects of such voltage transients, the gap is increased by forming trenches 15a, 15b, 15c, 15d in the substrate below the interleaved comb electrodes 43, 45. The trenches are disposed on the substrate substantially directly below the interleaved comb electrodes. More particularly, the interleaved comb electrodes have a length 33, and the trenches extend along the substrate for a length 35 which is equal to or greater than the interleaved comb electrode length as shown in FIG. 1.

Further placement details for the trenches are illustrated in FIG. 3. The interleaved comb electrodes 43, 45 have three regions which define width of overlap: region A is an unengaged drive comb electrode region, region B is an engaged comb electrode region, and region C is an unengaged proof mass comb electrode region. Magnitude of region B is directly related to maximum drive amplitude, i.e., greater width affords greater maximum drive amplitude. It should be appreciated, however, that regions A–C vary as the proof mass is vibrated, and this variation is taken into account when determining trench placement. In particular, the trenches are disposed between the substrate and the comb electrodes such that the trenches have a width 47 greater than or equal to a maximum operational width of region B. The term "overlap region" as used herein refers, therefore, to the maximum operational width of region B. Further, the trenches are disposed on the substrate substantially directly below the overlap region.

Turning again to FIGS. 1 & 2, the trenches have a box-like shape with substantially flat walls 37 which are parallel to the Z-axis. The trenches have a width 47 which is substantially greater than or equal to the overlap region. It will be appreciated, however, that the shape and dimensions of the trenches may be varied without loss of the advantages of the present invention provided separation of the interleaved comb electrodes and the surface of the substrate is increased.

Trench excavation in crystal silicon or glass can be done by well known techniques such as isotropic etching. The trench may also be formed by reactive ion etching, chlorine etching, $SF_6$ etching, or anisotropic etching. In the embodiment described above, the trenches have a depth 39 of approximately 6 $\mu$m and the gap between the interleaved comb electrodes and the substrate surface in the trenches is approximately 8.5 $\mu$m. This arrangement has been found to reduce the undesirable effects due to substrate voltage transients by as much as 50–65%. However, it has also been found that trench depth can be increased to 10 $\mu$m or more in order to further alleviate and even eliminate the effects of substrate charging. The trenches can also be combined with other techniques for additional performance enhancement and flexibility in reconciling performance and cost.

Although the tuning fork gyroscope has been thus far described and illustrated with trenches below each set of interleaved comb electrodes, alternate embodiments are possible and may present a superior solution for some applications. For example, to create a tuning fork gyroscope with variation of 300+ degrees per hour it is sufficient to place trenches below the inner interleaved comb electrodes 43 alone, rather than below both the inner and outer interleaved comb electrodes 43, 45.

FIG. 4 is a plan view of an alternative embodiment of the tuning fork gyroscope of FIG. 1. In this embodiment trenches are formed in the substrate below the support flexure. In particular, first, second and third sets of trenches 51, 53, 55 are formed below the drive beams, torsion beams and base beams, respectively. These additional trenches further alleviate the undesirable effects of substrate voltage transients by providing increased separation between vibrating structures (proof masses, comb electrodes and support flexure) and the substrate.

It should be understood the invention is not limited to the particular embodiments shown and described herein, but that various changes and modifications may be made without departing from the spirit and scope of this novel concept as defined by the following claims.

What is claimed is:

1. A drive for imparting a vibratory force to a vibrating member with a driving member, the vibrating member suspended above a surface of a substrate by a support flexure, comprising:

first comb electrodes connected to the driving member;

second comb electrodes connected to the vibrating member, said second comb electrodes interleaved with said first comb electrodes, an overlap region defined thereby, a gap being defined between the substrate surface and the interleaved comb electrodes; and a trench formed in the substrate substantially between the interleaved comb electrodes and the substrate such that the gap between the substrate surface and the interleaved comb electrodes is increased.

2. The drive of claim 1 wherein said trench has a width dimension which is greater than or equal to said overlap region.

3. The drive of claim 2 wherein said trench has a depth dimension which is from 6 $\mu$m to 10 $\mu$m, inclusive.

4. The drive of claim 3 wherein said trench is formed by a dissolved wafer process.

5. The drive of claim 2 wherein said trench has a depth dimension which is greater than 10μm.

6. The drive of claim 5 wherein said trench is formed by a technique selected from the group consisting of reactive ion etching, chlorine etching, $SF_6$ etching and anisotropic etching.

7. A tuning fork gyroscope comprising:
    a substrate with a surface;
    an outer drive with comb electrodes;
    an inner drive with comb electrodes;
    proof masses with inner and outer comb electrodes, said proof masses suspended above said substrate by support flexure, said inner comb electrodes interleaved with said inner drive comb electrodes and said outer comb electrodes interleaved with said outer drive comb electrodes, an overlap region defined by said interleaved comb electrodes, a gap being defined between the substrate surface and the interleaved comb electrodes; and
    trenches formed in said substrate substantially between said inner interleaved comb electrodes and said substrate such that the gap between said substrate surface and said inner interleaved comb electrodes is increased.

8. The tuning fork gyroscope of claim 7 wherein said trenches have a width dimension which is greater than or equal to said overlap region.

9. The tuning fork gyroscope of claim 8 wherein said trenches have a depth dimension which is from 6 μm to 10 μm, inclusive.

10. The tuning fork gyroscope of claim 8 wherein said trenches have a depth dimension which is greater than 10 μm.

11. The tuning fork gyroscope of claim 9 wherein said gap is increased by said trenches from about 2.5 μm to a gap from 8.5 μm to 12.5 μm, inclusive.

12. The tuning fork gyroscope of claim 8 wherein trenches are also formed in said substrate substantially between the outer interleaved comb electrodes and the substrate.

13. The tuning fork gyroscope of claim 12 wherein said trenches have a depth dimension which is from 6 μm to 10 μm, inclusive.

14. The tuning fork gyroscope of claim 12 wherein said trenches have a depth dimension which is greater than 10 μm.

15. The tuning fork gyroscope of claim 13 wherein said gap is increased by said trenches from about 2.5 μm to a gap from 8.5 μm to 12.5 μm, inclusive.

16. The tuning fork gyroscope of claim 7 wherein trenches are also formed in said substrate substantially between the support flexure and the substrate.

17. In a tuning fork gyroscope having interleaved comb electrodes defining an overlap region and a substrate surface with a gap defined therebetween, a method for alleviating undesirable effects of substrate voltage transients on gyroscope operation comprising the step of:
    increasing the gap between the interleaved comb electrodes and the substrate surface by forming a trench in the substrate substantially between the interleaved comb electrodes and the substrate in the overlap region of the interleaved comb electrodes.

18. In a tuning fork gyroscope having interleaved comb electrodes and a substrate surface with a gap defined therebetween, and a support flexure, a method for alleviating undesirable effects of substrate voltage transients on gyroscope operation comprising the step of:
    increasing the gap between the interleaved comb electrodes and the substrate surface by forming trenches below the interleaved comb electrodes and forming trenches below the support flexure.

19. The method of claim 17 wherein said step of forming the trench is accomplished by a technique selected from the group consisting of reactive ion etching, chlorine etching, $SF_6$ etching and anisotropic etching.

* * * * *